(12) United States Patent
Iliescu

(10) Patent No.: US 11,192,627 B2
(45) Date of Patent: Dec. 7, 2021

(54) AIRCRAFT WING WITH DEPLOYABLE FLAP

(71) Applicant: BOMBARDIER INC., Dorval (CA)

(72) Inventor: Vlad Iliescu, Kirkland (CA)

(73) Assignee: BOMBARDIER INC., Dorval (CA)

( * ) Notice: Subject to any disclaimer, the term of this patent is extended or adjusted under 35 U.S.C. 154(b) by 260 days.

(21) Appl. No.: 16/438,848

(22) Filed: Jun. 12, 2019

(65) Prior Publication Data

US 2019/0382099 A1 Dec. 19, 2019

Related U.S. Application Data

(60) Provisional application No. 62/686,397, filed on Jun. 18, 2018.

(51) Int. Cl.
*B64C 3/38* (2006.01)
*B64C 9/34* (2006.01)
*B64C 13/16* (2006.01)

(52) U.S. Cl.
CPC .............. *B64C 3/38* (2013.01); *B64C 9/34* (2013.01); *B64C 13/16* (2013.01)

(58) Field of Classification Search
CPC .. B64C 3/38; B64C 9/34; B64C 13/16; B64C 9/16; B64C 9/02; Y02T 50/40; Y02T 50/30
See application file for complete search history.

(56) References Cited

U.S. PATENT DOCUMENTS

| 2,502,315 | A | * | 3/1950 | Earhart | B64C 9/18 244/216 |
| 3,785,594 | A | * | 1/1974 | Lee | B64C 9/20 244/216 |
| 4,471,927 | A | * | 9/1984 | Rudolph | B64C 9/16 244/215 |
| 5,839,698 | A | * | 11/1998 | Moppert | B64C 3/50 244/217 |
| 9,108,723 | B2 | * | 8/2015 | Lam | B64C 9/02 |

(Continued)

FOREIGN PATENT DOCUMENTS

WO  2018/005534 A1  1/2018

OTHER PUBLICATIONS

European Search Report dated Sep. 17, 2019 in the parent European Patent Application No. 19180621.5.

*Primary Examiner* — Assres H Woldemaryam
(74) *Attorney, Agent, or Firm* — Norton Rose Fulbright Canada LLP

(57) ABSTRACT

An aircraft wing includes a groove extending along a length between a forward extremity and an aft extremity. A forward segment of the groove extends upwardly to the forward extremity. The forward extremity is a highest point of the groove. A flap carriage is mounted to the groove and displaceable therealong. A flap is pivotably attached to the flap carriage to define a flap pivot axis about which the flap is rotatable. The flap is displaceable with the flap carriage. An actuator has an arm being extendable between an extended position and a retracted position to displace the flap carriage along the groove. The flap carriage in the retracted position being disposed in the forward segment of the groove and the flap being rotated about the flap pivot axis to position the flap trailing edge in negative flap deployment.

18 Claims, 5 Drawing Sheets

(56) References Cited

U.S. PATENT DOCUMENTS

2004/0004162 A1\* 1/2004 Beyer .................. B64C 9/18
　　　　　　　　　　　　　　　　　　　　244/216
2015/0090843 A1\* 4/2015 Guering ................ B64C 9/06
　　　　　　　　　　　　　　　　　　　　244/215

\* cited by examiner

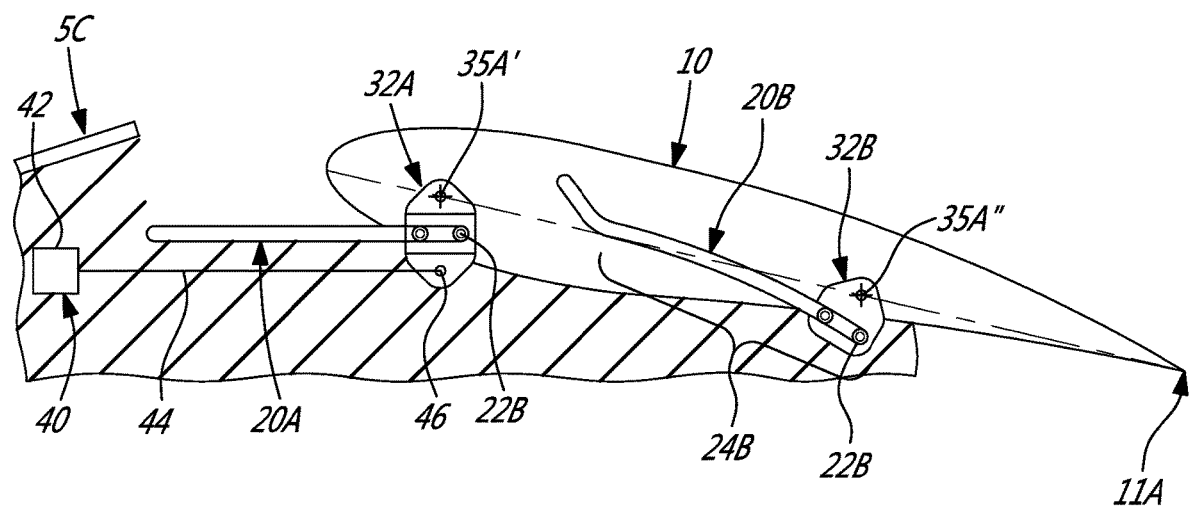

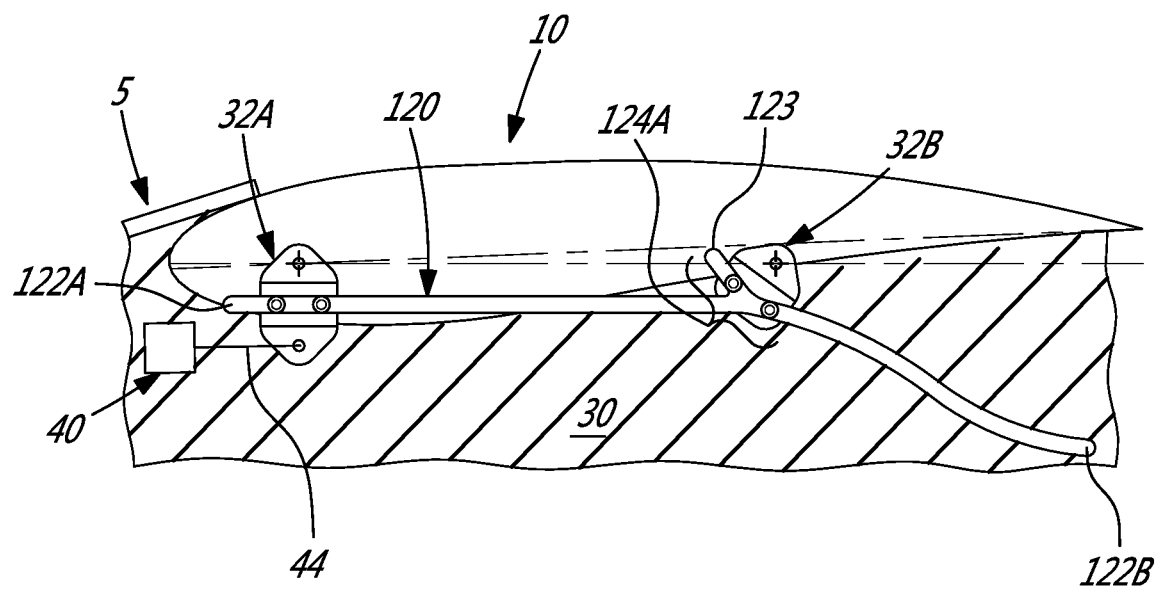
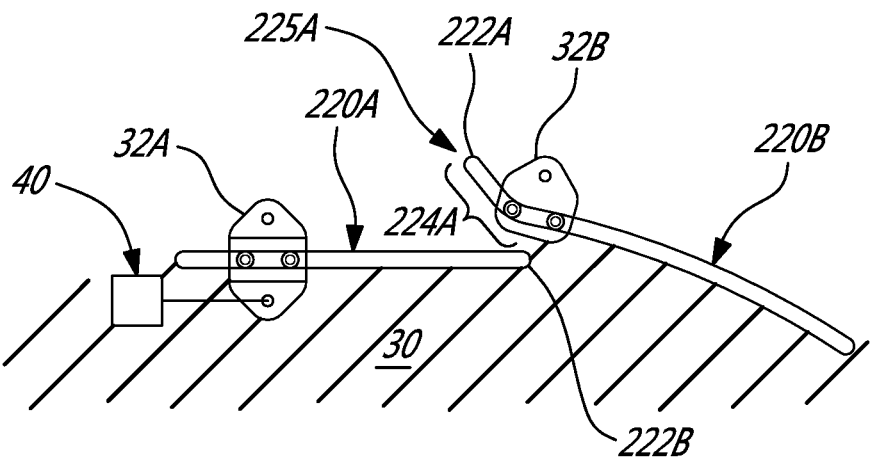

AIRCRAFT WING WITH DEPLOYABLE FLAP

CROSS-REFERENCE TO RELATED APPLICATIONS

This application claims priority to U.S. provisional patent application 62/686,397 filed on Jun. 18, 2018, the entire contents of which are incorporated by reference herein.

TECHNICAL FIELD

The application relates generally to aircraft control surfaces and, more particularly, to flaps for aircraft wings.

BACKGROUND

Aircraft flight control surfaces connected to the wing of an aircraft are used to control and adjust the flight attitude of the aircraft. Examples of these control surfaces include flaps, spoilers, and ailerons.

The flaps are generally mounted to the trailing edge of the wing. Traditionally the flaps are deployed downwards, which is referred to as a "positive" functionality of the flaps. The positive functionality increases the camber of the wing, thereby increasing the lift generated by the wing while also increasing drag. For aircraft wings having this variable camber, there may be an aerodynamic benefit to allow relatively small upwards deployment, which is referred to as "negative" flap functionality, in addition to the typical "positive" flap functionality provided by the flaps. Some existing systems used to provide the flaps with "negative" flap functionality involve complex mechanisms, and require multiple actuating devices which may result in increased cost, weight, installation time, reduced reliability, and more complex control requirements.

SUMMARY

In one aspect, there is provided an aircraft wing, comprising: a structural member disposed at a trailing edge of the aircraft wing and having at least one groove extending along a length between a forward extremity and an aft extremity, a forward segment of the at least one groove disposed at a forward end thereof and extending upwardly to the forward extremity, the forward extremity being a highest point of the at least one groove; at least one flap carriage mounted to the at least one groove and displaceable therealong between the forward and aft extremities; a flap extending between a flap leading edge and a flap trailing edge, the flap being pivotably attached to the at least one flap carriage to define at least one flap pivot axis about which the flap is rotatable, the flap being displaceable with the at least one flap carriage; and an actuator having a housing and an arm with a distal end mounted to the at least one flap carriage, the arm being extendable relative to the housing between an extended position and a retracted position to displace the at least one flap carriage along the at least one groove, the at least one flap carriage in the retracted position being disposed in the forward segment of the at least one groove and the flap being rotated about the at least one flap pivot axis to position the flap trailing edge in negative flap deployment.

In an embodiment, the flap is pivotably attached to the at least one flap carriage to position the at least one flap pivot axis closer to the flap trailing edge than to the flap leading edge.

In an embodiment, the aft extremity is a lowest point of the at least one groove.

In an embodiment, the at least one groove has an aft segment extending in an aft direction from the forward segment to the aft extremity, the aft segment being lower than the forward segment, the at least one flap carriage in the extended position being disposed in the aft segment and the flap being rotated about the flap pivot axis to position the flap trailing edge in positive flap deployment.

In an embodiment, the forward segment of the at least one groove is transverse to the aft segment.

In an embodiment, the at least one flap carriage in the retracted position occupies a position in the at least one groove that is higher than a position of the at least one flap carriage in the at least one groove in the extended position.

In an embodiment, the at least one groove includes a forward groove and an aft groove spaced apart aft of the forward groove, the aft groove having the forward segment disposed at a forward end thereof and extending upwardly to the forward extremity being the highest point of the aft groove; the at least one flap carriage includes a forward flap carriage mounted to the forward groove and displaceable therealong, and an aft flap carriage mounted to the aft groove and displaceable therealong between the forward and aft extremities, the flap being pivotably attached to the forward flap carriage to define a forward flap pivot axis, and being pivotably attached to the aft flap carriage to define an aft flap pivot axis; and the distal end of the actuator is mounted to one of the forward and aft flap carriages.

In an embodiment, the distal end of the actuator is mounted to the forward flap carriage.

In an embodiment, the forward groove is free of curvature.

In an embodiment, in the retracted position, the aft flap carriage is disposed in the forward segment of the aft groove and the flap is rotated about the aft flap pivot axis to position the flap trailing edge in negative flap deployment, and the forward flap carriage is disposed in proximity to a forward extremity of the forward groove; and in the extended position, the aft flap carriage is disposed aft of the forward segment of the aft groove and the flap is rotated about the aft flap pivot axis to position the flap trailing edge in positive flap deployment, and the forward flap carriage is disposed in proximity to an aft extremity of the forward groove.

In an embodiment, the forward extremity of the aft groove is the highest point of both the forward and aft grooves.

In an embodiment, the at least one groove includes a forward groove and an aft groove spaced apart aft of the forward groove, the aft groove having the forward segment disposed at a forward end thereof and extending upwardly to the forward extremity being the highest point of the aft groove; the at least one flap carriage includes a single flap carriage mounted to the forward and aft grooves and displaceable therealong, the flap being pivotably attached to the single flap carriage to define a forward flap pivot axis and an aft flap pivot axis.

In an embodiment, the at least one groove includes a single groove, and the at least one flap carriage includes a single flap carriage mounted to the single groove.

In another aspect, there is provided a method of deploying a flap pivotably mounted to a groove in a trailing-edge structure of an aircraft wing, the method comprising: displacing the flap along the groove in at least a forward direction to a highest point of the groove being a forward-most extremity of the groove, displacement of the flap to the highest point of the groove causing the flap to pivot and position a flap trailing edge in negative flap deployment.

In an embodiment, the method further comprises displacing the flap along the groove in an aft direction to a lowest point of the groove being an aftmost extremity of the groove, displacement of the flap toward the aft extremity causing the flap to pivot to position the flap trailing edge in positive flap deployment.

In an embodiment, the method further comprises displacing the flap along the groove to a position between the forwardmost and aftmost extremities, displacement of the flap to the position causing the flap to pivot to position the flap trailing edge in neutral flap deployment.

In an embodiment, displacing the flap along the groove in at least the forward direction causes the flap to pivot about a flap pivot axis being closer to the flap trailing edge than to a flap leading edge.

In an embodiment, displacing the flap along the groove includes displacing the flap along a forward groove and an aft groove spaced apart aft of the forward groove, the aft groove having the highest point, displacement of the flap causing the flap to pivot about a forward pivot axis and an aft pivot axis.

In an embodiment, displacing the flap along the forward and aft grooves includes applying a force to the flap at a point thereon along the forward groove to displace the flap along both the forward and aft grooves.

In an embodiment, displacing the flap along the forward and aft grooves includes displacing the flap along the forward groove in a direction being substantially straight.

DESCRIPTION OF THE DRAWINGS

Reference is now made to the accompanying figures in which:

FIG. 3D is another side elevational view of the flap of FIG. 3A, the flap being shown in greater positive flap deployment;

FIG. 5 is a side elevational view of one of the flaps shown in FIG. 2, with a groove according to another embodiment of the present disclosure; and FIG. 6 is a side elevational view of grooves according to another embodiment of the present disclosure.

DETAILED DESCRIPTION

Figure 1:
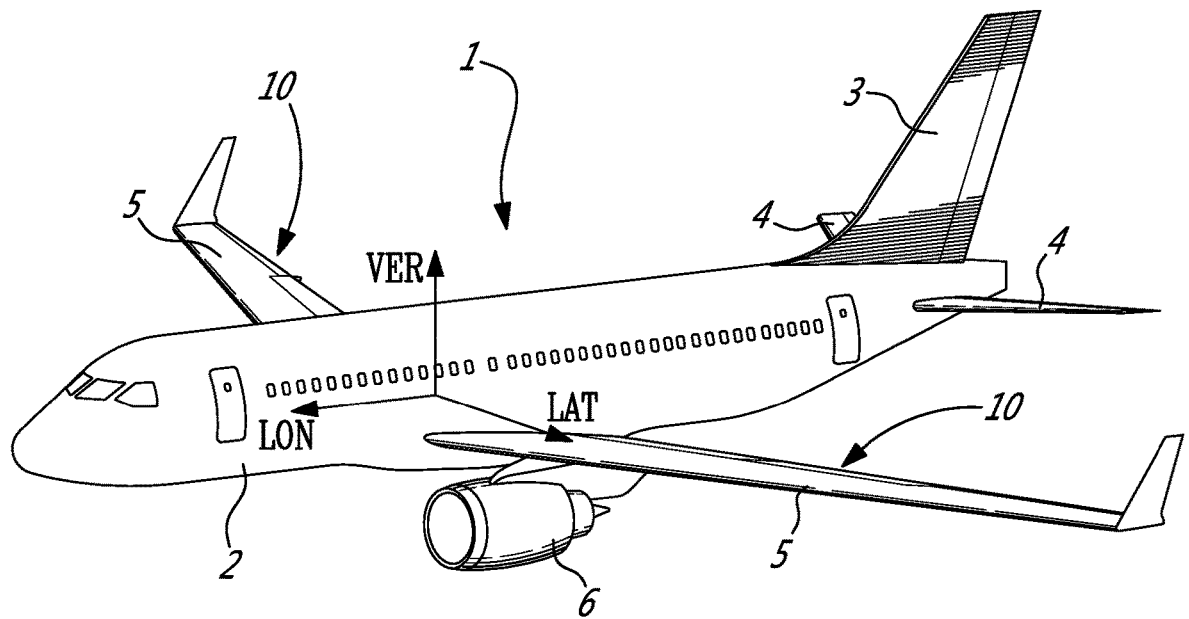
FIG. 1 is a schematic tridimensional view of an aircraft.

Referring to the drawings and more particularly to FIG. 1, an aircraft is shown at 1, and is generally described to illustrate some components for reference purposes in the present disclosure. The aircraft 1 has a fuselage 2 having a fore end and an aft end, with a cabin generally located between the cockpit and the tail assembly. A tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage 2. The aircraft 1 has engines 6 mounted to the wings 5 in the depicted embodiment, although for other aircraft they can be supported by the fuselage 2. The aircraft 1 is shown as a jet-engine aircraft, but may also be a propeller aircraft. It is also understood that the aircraft 1 can be a business aircraft, alternately it can be any other type of aircraft, including, but not limited to, a commercial aircraft or a military aircraft.

During flight, the aircraft 1 is free to rotate about three perpendicular axes of motion. More particularly, during flight the aircraft 1 is free to pitch about a transverse or lateral axis LAT which extends between the tips of the wings 5, to roll or bank about a longitudinal axis LON extending from the nose to the tail assembly, and to yaw about a vertical axis VER extending from a top of the aircraft 1 to its bottom. These axes LAT,LON,VER move with the aircraft 1 and define one of its frames of reference.

Figure 2:
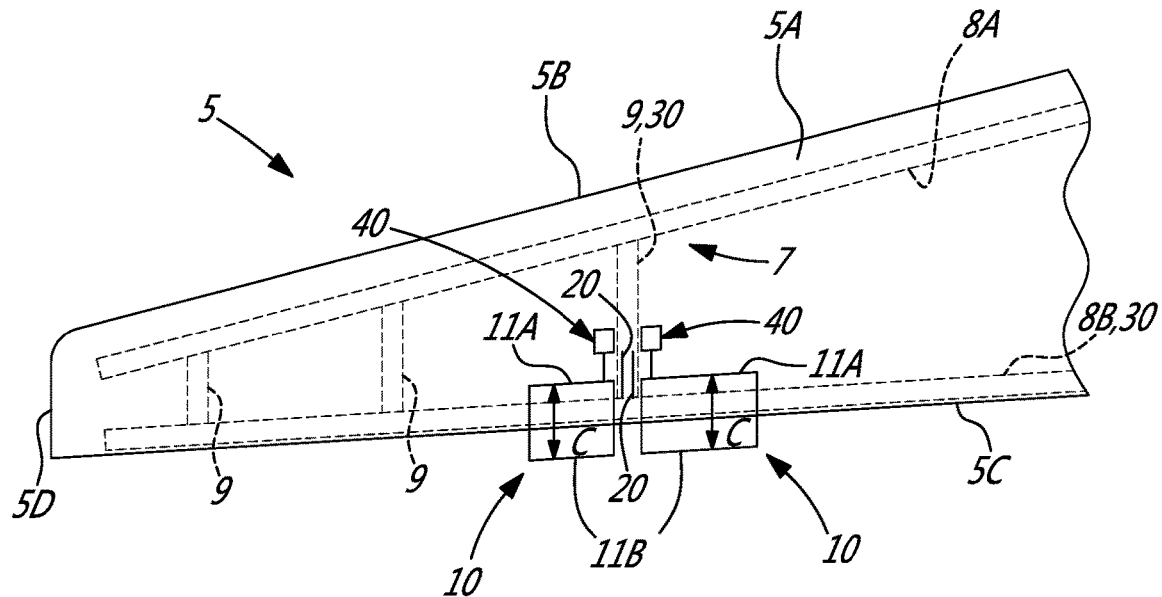
FIG. 2 is a top view of part of an aircraft wing of the aircraft shown in FIG. 1, the aircraft wing shown with flaps.

FIG. 2 shows part of one of the wings 5 of the aircraft 1. The wing 5 has an airfoil body 5A whose acting surfaces are defined by a skin of the wing 5 being formed about an internal frame 7 or structure of the wing 5. The airfoil body 5A extends along the longitudinal axis LON of the aircraft 1 between a leading edge 5B of the wing 5, and a trailing edge 5C of the wing 5. The airfoil body 5A extends along a spanwise axis of the wing 5, or along the lateral axis LAT of the aircraft 1, between a root (not shown in FIG. 2) of the airfoil body 5A and a tip 5D of the airfoil body 5A. A span of the wing 5 is defined between the root and the tip 5D. The internal frame 7 of the wing 5 includes any suitable arrangement of spars, ribs, stringers, and other members. In FIG. 2, the internal frame 7 includes a front spar 8A and a rear or aft spar 8B, which are interconnected by multiple transverse ribs 9.

The wing 5 may include multiple flight control surfaces (e.g. flaps, spoilers, ailerons, etc.), of which only flaps 10 are shown in FIG. 2 for the purposes of clarity. Each of the flaps 10 is shaped as an airfoil, and the airfoil may be symmetric or asymmetric. Each of the flaps 10 has a chord C extending between a flap leading edge 11A and a flap trailing edge 11B. The flaps 10 are disposed at, or aft of, the trailing edge 5C of the wing 5 and spaced apart therealong, along inboard (i.e. closer to the root of the airfoil body 5A) and/or outboard (i.e. closer to the tip 5D of the airfoil body 5A) sections of the span. The flaps 10 are deployed to modify the effective curvature of the wing 5. The flaps 10 may be retracted underneath the wing 5 and thus may not contribute significantly to the aerodynamic characteristics of the wing 5 during high-speed flight of the aircraft 1. The flaps 10 may be used during low speed, high angle of attack flight envelopes, including take-off and descent and landing. The flaps 10 may include any suitable type of flap including, but not limited to, a plain flap, split flap, slotted flap, Fowler flaps, Junkers flap, and Gouge flap.

As will be described in greater detail below, the flaps 10 are deployable to vary the camber of the wing 5. The flaps 10 are displaceable in a forward direction and in an aft direction (i.e. toward the fore end, and toward the aft end of the aircraft 1). Each flap 10 is displaceable along one or more grooves 20, shown in greater detail in subsequent figures, which are formed or imbedded in a structural member 30 attached to the aircraft wing 5. Each structural member 30 may be a component of the internal frame 7.

Each structural member 30 may take any suitable form. In the depicted embodiment, the grooves 20 are defined in the ribs 9 of the internal frame 7. At a supporting station, an actuator 40 is also mounted to one or more of the ribs 9 to drive deployment of the flaps 10 along the grooves 20. In an alternate embodiment, the grooves 20 are defined in the aft spar 8B of the internal frame 7, and the structural member 30 therefore corresponds to the aft spar 8B. Another possible structural member 30 includes a flap track beam.

FIGS. 3A to 3D provide a side view of the grooves 20 formed in the structural member 30, which in the depicted embodiment include a forward groove 20A and an aft groove 20B. The forward groove 20A is disposed more forward of the aft groove 20B (i.e. in a direction toward the leading edge 5B of the wing 5), and spaced apart therefrom. The forward and aft grooves 20A,20B are spaced apart by a portion of the structural member 30. The forward and aft grooves 20A,20B in the depicted embodiment are therefore discontinuous. The length, shape and spacing of the forward and aft grooves 20A,20B helps to achieve specific flap surface positions, as described in greater detail below.

The forward and aft grooves 20A,20B are elongated slots, channels, tracks, etc. formed in the structural member 30, and extend in a substantially forward-aft direction of the wing 5. The forward and aft grooves 20A,20B extend in a direction that is transverse to the span of the wing 5. The forward and aft grooves 20A,20B extend in a direction along the desired motion direction of the flap 10. Each of the forward and aft grooves 20A,20B has a length defined along a directional axis or line between a forward extremity 22A and an aft extremity 22B. In the depicted embodiment, the forward extremity 22A of each groove 20A,20B is the forward-most extremity, or the point on each groove 20A, 20B which is closest to the leading edge 5B of the wing 5. Similarly, the aft extremity 22B of each groove 20A,20B is the aft-most extremity, or the point on each groove 20A,20B which is furthest from the leading edge 5B of the wing 5. The forward groove 20A in the depicted embodiment is free of curvature. The forward groove 20A is flat. In an alternate embodiment, the forward groove 20A has a curvature that is greater than zero.

Still referring to FIGS. 3A to 3D, the aft groove 20B has a forward segment 24A and an aft segment 24B. The forward segment 24A occupies a portion of the length of the aft groove 20B at a forward end 25A thereof, and is the forward-most portion of the aft groove 20B. The aft segment 24B occupies the remainder of the length of the aft groove 20B, and extends in an aft direction from the forward segment 24A to the aft extremity 22B. In the depicted embodiment, the forward and aft segments 24A,24B of the aft groove 20B are continuous and free of obstruction. Although shown as being curved and sloped, the aft segment 24B of the aft groove 20B may be flat or straight.

The forward segment 24A is a kinked portion of the aft groove 20B, in that it represents a relatively sharp turn or twist when compared to the aft segment 24B of the aft groove 20B. The forward segment 24A is transverse to the aft segment 24B. Stated differently, the forward segment 24A is not parallel to the aft segment 24B. Each of the forward and aft segments 24A,24B of the aft groove 20B extend along directional axes which are not parallel. In the depicted embodiment, the directional axis of the forward segment 24A is transverse to a line extending between the forward and aft extremities 22A,22B of the aft groove 20B.

The forward segment 24A has an upward orientation. The forward segment 24A extends upwardly from a location on the length of the aft groove 20B and terminates at the forward extremity 22A. In an embodiment, the forward segment 24A of the aft groove 20B is oriented substantially parallel to the vertical axis VER of the aircraft 1, or forms an acute angle therewith. The forward extremity 22A is therefore the highest or uppermost point of the aft groove 20B. The forward extremity 22A is thus higher than the aft extremity 22B of the aft groove 20B. Indeed, in the depicted embodiment, the forward extremity 22A of the aft groove 20B is the highest point of both the forward and aft grooves 20A,20B. In FIGS. 3A to 3D, the aft extremity 22B is the bottommost or lowest point of the aft groove 20B. It follows that the aft segment 24B of the aft groove 20B is lower than the forward segment 24A of the aft groove 20B. The aft segment 24B of the aft groove 20B is thus below, and slopes downwardly from, the forward segment 24A of the aft groove 20B.

Figure 3B:
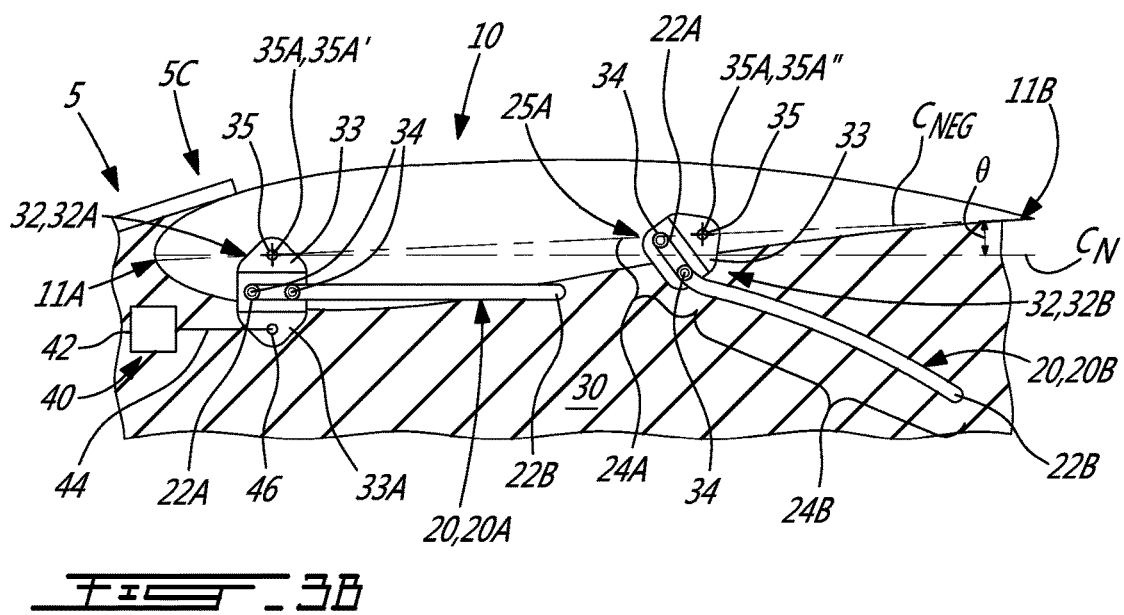
FIG. 3B is a side elevational view of the flap of FIG. 3A, the flap being shown in negative flap deployment.
Figure 3A:
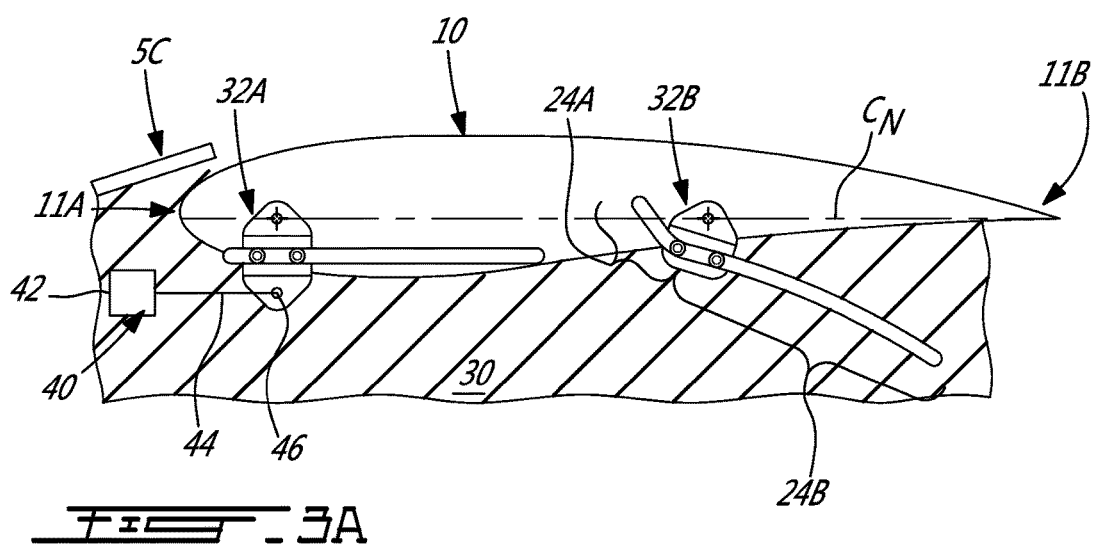
FIG. 3A is a side elevational view of one of the flaps shown in FIG. 2 with flap carriages and an actuator, the flap being shown in neutral flap deployment.

Still referring to FIGS. 3A to 3D, the flap 10 is mounted to the forward and aft grooves 20A,20B via flap carriages 32. The flap carriages 32 are displaceable along the forward and aft grooves 20A,20B between their forward and aft extremities 22A,22B to effect displacement of the flap 10. In the depicted embodiment, the flap carriages 32 include a forward flap carriage 32A and an aft flap carriage 32B. Each of the forward and aft flap carriages 32A,32B has a mounting bracket 33 with rollers 34. The rollers 34 are positioned within the forward and aft grooves 20A,20B to allow the forward and aft flap carriages 32A,32B to displace therealong. Each mounting bracket 33 has a flap pivot 35 through which the flap 10 is pivotably mounted to the mounting bracket 33. The flap 10 and the mounting brackets 33 of the forward and aft flap carriages 32A,32B are therefore pivotable relative to each other about a flap pivot axis 35A defined by each flap pivot 35. The pivoting of the flap 10 about the flap pivot axes 35A allows for the position and orientation of the flap trailing edge 11B to be modified. In FIGS. 3A and 3D, each mounting bracket 33 has two rollers 34 which are rotatable about their own axis. In most positions of the forward and aft flap carriages 32A,32B along the respective forward and aft grooves 20A,20B, a line extending between the axes of the rollers 34 of each mounting bracket 33 is parallel to the directional axis of the forward and aft grooves 20A,20B. The rollers 34 are attached to each mounting bracket 33 to prevent pivotable movement between the rollers 34 and their mounting bracket 33. It will be appreciated that flap 10 may be mounted to the forward and aft grooves 20A,20B using other connectors or devices. For example, in an alternate embodiment, each mounting bracket 33 has skis for sliding displacement along the forward and aft grooves 20A,20B.

Figure 3C:
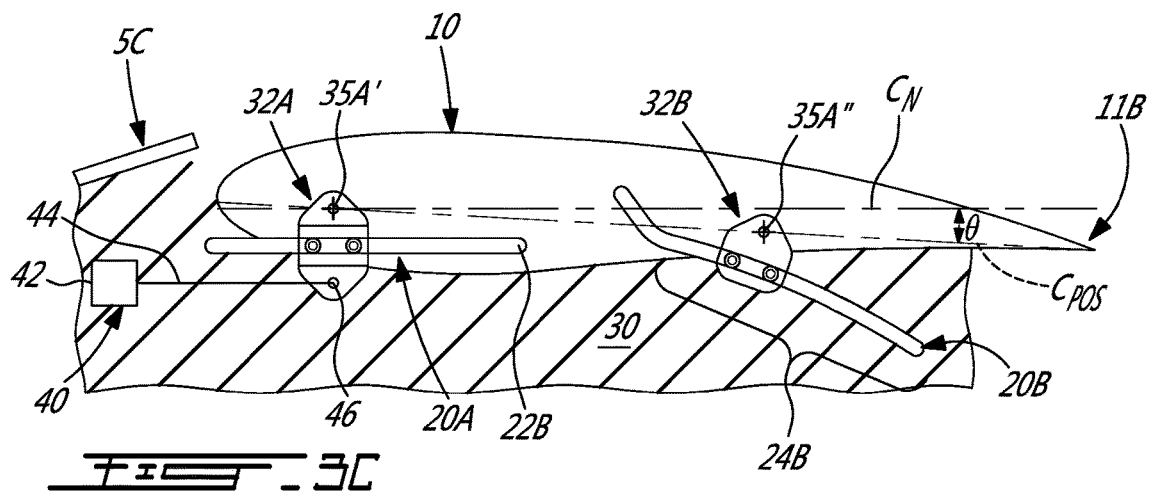
FIG. 3C is another side elevational view of the flap of FIG. 3A, the flap being shown in positive flap deployment.

The forward and aft flap carriages 32A,32B, flap 10, and the forward and aft grooves 20A,20B form a flap track system or flap rail system to allow the flap 10 to displace with respect to the trailing edge 5C of the wing 5. This movement of the flap 10 helps to modify the camber and surface area of the wing 5. Displacement of the flap 10 is caused by one or more actuator(s) 40, shown schematically in FIGS. 3A to 3D. More particularly, the actuator 40 applies a force to one or more of the flap carriages 32 to displace the flap carriages 32 in the grooves 20, and to thus displace the flap 10. The actuator 40 has a housing 42 mounted to the structural member 30, and an arm 44 which is displaceable with respect to the housing 42 to extend and retract. A distal end 46 of the arm 44 is mounted to one of the forward and aft flap carriages 32A,32B. In FIGS. 3A to 3C, the distal end 46 of the arm 44 of the actuator 40 is mounted only to the forward flap carriage 32A, although other configurations are possible, like mounting the distal end 46 of the arm 44 directly to flap 10. Displacement of the forward flap carriage 32A by the arm 44 will in turn cause displacement of the aft flap carriage 32B. It will thus be appreciated that only one actuator 40 may be needed to deploy the flap 10. In an alternate embodiment, two actuators 40 are provided to actuate each side (inboard and outboard) of the flap 10. In the depicted embodiment, the mounting bracket 33 of the forward flap carriage 32A has a lower portion 33A at which the distal end 46 of the arm 44 is attached. The actuator 40 may be powered by any suitable hydraulic, electric, or pneumatic source, and may include screw jacks, a mechanical pushrod, rotary actuators, or other mechanisms for pushing and/or pulling the forward flap carriage 32A along a length of the forward groove 20A. The actuator 40 for each flap 10 may be driven by a single drive shaft extending between all the actuators 40 of the wing 5, or each actuator 40 may have its own powered drive.

The arm 44 of the actuator 40 is extendable relative to the housing 42 between an intermediate or neutral position shown in FIG. 3A, a retracted position shown in FIG. 3B, and a fully extended position shown in FIG. 3D, to displace the forward and aft flap carriages 32A,32B along their respective forward and aft grooves 20A,20B, and to thereby displace the flap 10.

In the neutral position shown in FIG. 3A, the aircraft 1 may be in a cruise flight condition, and thus the position of the flap 10 shown in FIG. 3A may be the cruising position. The aft flap carriage 32B is disposed towards the forward end 25A of the aft segment 24B of the aft groove 20B, and the forward carriage 32A is disposed towards a forward end of the forward groove 20A. This neutral position corresponds to a partially retracted position of the arm 44 of the actuator 40, and of the flap 10.

As the arm 44 retracts further by moving in a forward direction from the neutral position shown in FIG. 3A, the forward flap carriage 32A moves toward the retracted position shown in FIG. 3B. The retracted position shown in FIG. 3B shows the forward and aft carriages 32A,32B being fully retracted and disposed near the forward extremities 22A of the respective forward and aft grooves 20A,20B. Displacement of the forward aft carriage 32A causes the aft flap carriage 32B to be displaced upwardly into the forward segment 24A of the aft groove 20B. The flap pivot 35 of the aft flap carriage 32B pushes the trailing edge 11B of the flap 10 upwardly and causes the flap 10 to rotate about the flap pivot axis 35A. This upward movement of the flap 10 and its relative rotation about the flap pivot axis 35A causes the flap trailing edge 11B to assume a negative flap deployment. Negative flap deployment is an orientation of the flap trailing edge 11B in an upward direction. When the camber of the wing 5 is modified by the negative flap deployment of the flap 10, it may be possible to decrease drag over the wing 5 and thereby improve fuel efficiency.

As the arm 44 of the actuator 40 extends by moving in an aft direction from the neutral position shown in FIG. 3A, the forward flap carriage 32A moves aft along the forward groove 20A toward the extended position shown in FIG. 3C and eventually towards the fully extended position shown in FIG. 3D. The aft flap carriage 32B is displaced along the aft segment 24B of the aft groove 20B toward the aft extremity 22B of the aft groove 20B. The flap pivot 35 of the aft flap carriage 32B pushes the trailing edge 11B of the flap 10 downwardly and causes the flap 10 to rotate about the flap pivot axis 35A. This downward movement of the flap 10 and its relative rotation about the flap pivot axis 35A causes the flap trailing edge 11B to assume a positive flap deployment. Positive flap deployment is an orientation of the flap trailing edge 11B in an downward direction.

A flap angle θ of the flap 10 is the angular difference between the chord $C_N$ of the flap 10 when the flap 10 is in the neutral deployment position, as shown in FIG. 3A, and the chord $C_{NEG,POS}$ of the flap 10 when the flap 10 is in one of the negative or positive deployment positions, as shown in FIGS. 3B and 3C. Convention states that the value of the flap angle θ between the chord $C_N$ and the chord $C_{NEG}$ is negative when the flap trailing edge 11B is in an upward position with respect to the neutral position, as shown in FIG. 3B. Convention also states that the value of the flap angle θ between the chord $C_N$ and the chord $C_{POS}$ is positive when the flap trailing edge 11B is in a downward position with respect to the neutral position, as shown in FIG. 3C. Some non-limitative values for the flap angle θ include approximately −5° to +45 degrees, depending on the aerodynamic characteristics of the wing and the required aircraft performance.

In light of the preceding, it will be appreciated that the geometry of the aft groove 20B allows the movement of the aft flap carriage 32B from the extended or neutral position to the retracted position to displace the flap 10 in a forward direction such that the flap trailing edge 11B moves upwardly to negative flap deployment. More particularly, the geometry of the aft groove 20B, and in particular the forward segment 24A of the aft groove 20B, causes the aft flap carriage 32B to pivot with respect to the flap 10 and to push the trailing edge 11B of the flap 10 upward as the aft flap carriage 32B displaces in the forward direction along the forward segment 24A. The forward segment 24A of the aft groove 20B is thus shaped and positioned to help define the final upwardly-deployed position of the flap 10. The ability to provide the flap 10 with negative flap deployment is thus made possible because of the geometry of the aft groove 20B, such that negative flap deployment of the flap 10 is not dependent on a complex structure or mechanism for the aft flap carriage 32B, or on additional actuators 40, as is the case with some conventional solutions. The aft groove 20B therefore makes it possible to vary a camber of the wing 5 in both negative and positive deployment, thus helping to provide a "morphing" wing 5.

Still referring to FIGS. 3A to 3D, the flap 10 is pivotably attached to the forward flap carriage 32A to define a forward flap pivot axis 35A', and the flap 10 is pivotably attached to the aft flap carriage 32B to define an aft flap pivot axis 35A". The forward flap pivot axis 35A' is positioned between the forward and aft extremities 22A,22B of the forward groove 20A, and the aft flap pivot axis 35A" is positioned between the forward and aft extremities 22A,22B of the aft groove 20B, at all times during displacement of the flap 10. The aft flap pivot axis 35A" is positioned closer to the flap trailing edge 11B than to the flap leading edge 11A. The aft flap carriage 32B is therefore mounted in proximity to the flap trailing edge 11A, which may help to pivot the flap 10 relative to the aft flap carriage 32B when the aft flap carriage 32B is displaced into the forward segment 24A of the aft groove 20B, and thus achieve negative flap deployment.

Examples of deployment of the flap 10 are now described with reference to FIGS. 3A to 3D. Displacement of the arm 44 of the actuator 40 to the extended position will position the flap 10 in positive flap deployment, as shown in FIG. 3C. The arm 44 of the actuator 40 extends to drive its distal end 46 and thus the forward flap carriage 32A in an aft direction (i.e. toward the tail assembly of the aircraft 1). This causes the aft flap carriage 32B to also displace in the aft direction, and to travel along the aft segment 24B of the aft groove 20B toward the aft extremity 22B. FIG. 3D shows the aft flap carriage 32B in a maximum or fully extended position, where the aft flap carriage 32B is disposed in the aft segment 24B of the aft groove 20B in proximity to the aft extremity 22B, and the flap 10 is rotated about the aft flap pivot axis 35A" to position the flap trailing edge 11B at its maximum positive flap deployment (i.e. the flap trailing edge 11B will point downward). A forward portion of the flap 10 will also rotate about the forward flap pivot axis 35A'. The forward flap carriage 32A is disposed in proximity to an aft extremity 22B of the forward groove 20A.

Displacement of the arm 44 of the actuator 40 to the retracted position will position the flap 10 in negative flap deployment, as shown in FIG. 3B. The arm 44 of the actuator 40 retracts toward the housing 42 to retract the distal end 46 and thus the forward flap carriage 32A in a forward direction (i.e. toward the nose of the aircraft 1). This causes the aft flap carriage 32B to also displace in the forward direction, and to travel toward and along the forward segment 24A of the aft groove 20B toward the forward extremity 22A. As the aft flap carriage 32B begins to displace upwardly into the forward segment 24A of the aft groove 20B, the flap pivot 35 of the aft flap carriage 32B pushes an aft portion of the flap 10 upwardly and causes the flap 10 to rotate about the aft flap pivot axis 35A". A forward portion of the flap 10 will also rotate about the forward flap pivot axis 35A'. This upward movement of the flap 10 due to the upwards movement of the aft flap carriage 32B and its relative rotation about the aft flap pivot axis 35A" causes the flap trailing edge 11B to assume the negative flap deployment (i.e. the flap trailing edge 11B will point upward). The aft flap carriage 32B in the fully retracted position occupies a position in the aft groove 20B that is higher or above the position of the aft flap carriage 32B in the aft groove 20B when it is in the neutral or extended position. In the retracted position, the forward flap carriage 32A is disposed in proximity to the forward extremity 22A of the forward groove 20A. When being displaced between positive and negative flap deployment, the flap 10 moves through neutral flap deployment, as shown FIG. 3A. In neutral flap deployment, the flap angle is zero. Although shown in FIGS. 3A to 3D as being deployable between positive and negative flap deployment, in an alternate embodiment, the flap 10 is deployable only to negative flap deployment.

Figure 4B:
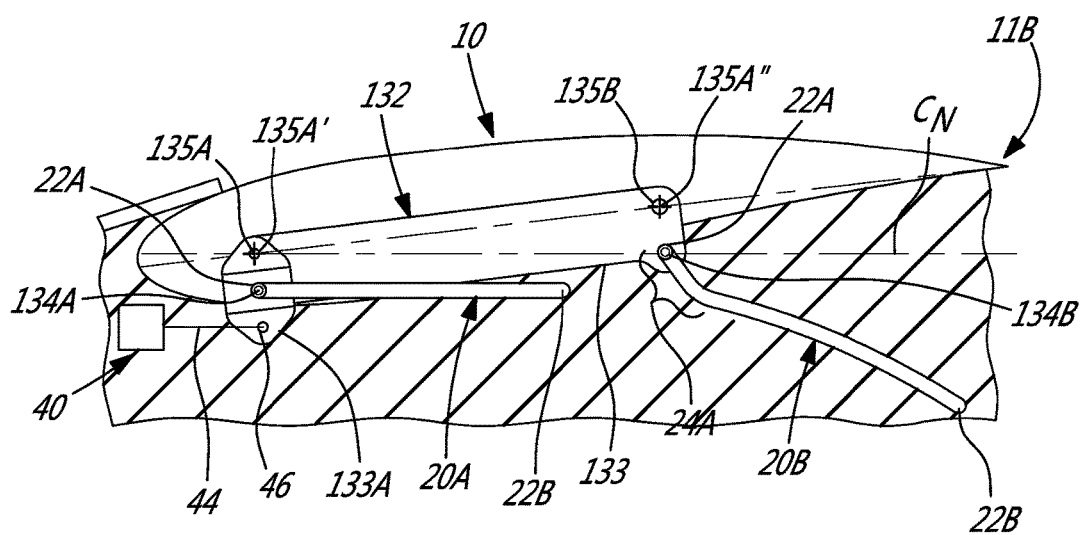
FIG. 4B is a side elevational view of the flap of FIG. 4A, the flap being shown in negative flap deployment.
Figure 4A:
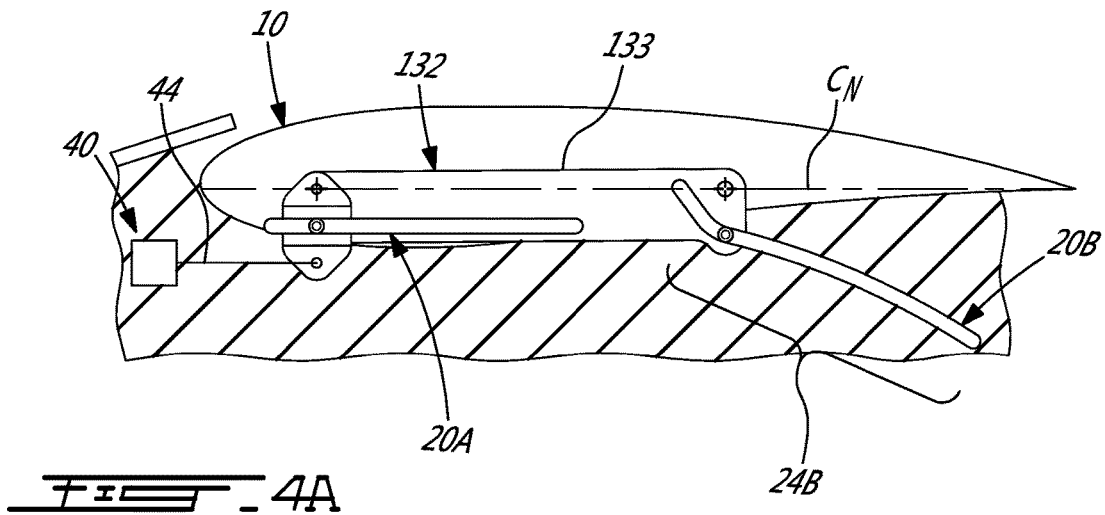
FIG. 4A is a side elevational view of one of the flaps shown in FIG. 2, with a flap carriage according to another embodiment of the present disclosure, the flap being shown in neutral flap deployment.
Figure 4C:
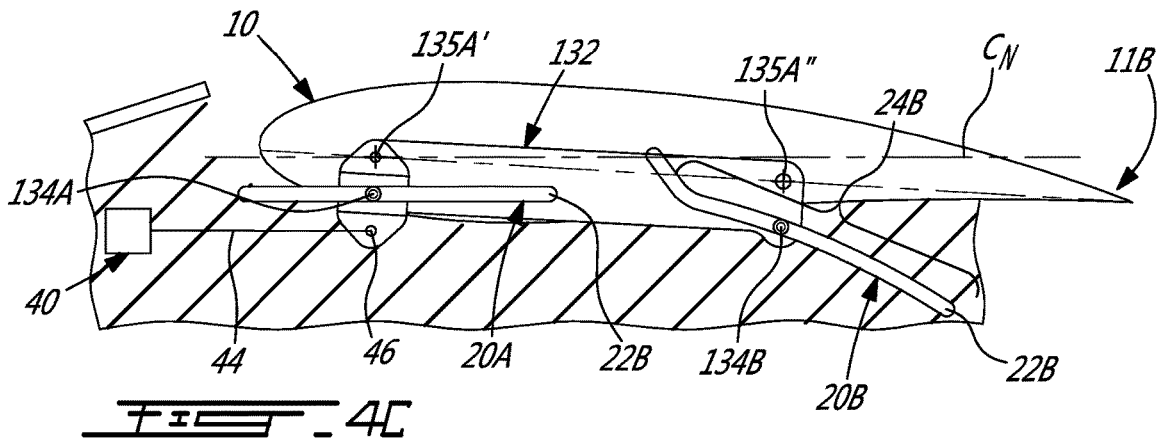
FIG. 4C is another side elevational view of the flap of FIG. 4A, the flap being shown in positive flap deployment.

FIGS. 4A to 4C show the flap 10 mounted to another embodiment of the flap carriage 132. The flap carriage 132 is used alone, such that the single flap carriage 132 is responsible for displacing the flap 10 between negative and positive flap deployment. The flap carriage 132 is displaceable along the forward and aft grooves 20A,20B between their forward and aft extremities 22A,22B to effect displacement of the flap 10. The flap carriage 132 has a single mounting bracket 133 with a forward roller 134A displaceable in the forward groove 20A, and an aft roller 134B displaceable in the aft groove 20B. The single mounting bracket 133 is pivotably attached to the flap 10 at two positions: a forward flap pivot 135A defining a forward flap pivot axis 135A', and an aft flap pivot 135B defining an aft flap pivot axis 135A". The forward flap pivot axis 135A' is positioned between the forward and aft extremities 22A,22B of the forward groove 20A, and the aft flap pivot axis 135A" is positioned between the forward and aft extremities 22A, 22B of the aft groove 20B, at all times during displacement of the flap 10. The flap 10 and the single mounting bracket 133 of the single flap carriage 132 are therefore pivotable relative to each other about the forward and aft flap pivot axes 135A',135A". The pivoting of the flap 10 about the forward and aft flap pivot axes 135A',135A" allows for the position and orientation of the flap trailing edge 11B to be modified. The actuator 40 applies a force to the single flap carriage 132 to displace the single flap carriage 132 in the forward and aft grooves 20A,20B, and to thus displace the flap 10. The distal end 46 of the arm 44 of the actuator 40 is mounted to the lower portion 133A of the single mounting bracket 133.

Examples of deployment of the flap 10 are now described with reference to FIGS. 4A to 4C. Displacement of the arm 44 of the actuator 40 to the extended position will position the flap 10 in positive flap deployment, as shown in FIG. 4C. The arm 44 of the actuator 40 extends to drive its distal end 46 and thus the single flap carriage 132 in an aft direction (i.e. toward the tail assembly of the aircraft 1). This causes the aft roller 134B to displace in the aft direction, and to travel along the aft segment 24B of the aft groove 20B toward the aft extremity 22B. In the extended position, the aft roller 134B of the single flap carriage 132 is disposed in the aft segment 24B of the aft groove 20B, and the flap 10 is rotated about the aft flap pivot axis 135A" to position the flap trailing edge 11B in positive flap deployment (i.e. the flap trailing edge 11B will point downward). The forward roller 134A is disposed closer to an aft extremity 22B of the forward groove 20A. A forward portion of the flap 10 will also rotate about the forward flap pivot axis 135A'.

Displacement of the arm 44 of the actuator 40 to the retracted position will position the flap 10 in negative flap deployment, as shown in FIG. 4B. The arm 44 of the actuator 40 retracts toward the housing 42 to retract the distal end 46 and thus the single flap carriage 132 in a forward direction (i.e. toward the nose of the aircraft 1). This causes the aft roller 134B to also displace in the forward direction, and to travel toward and along the forward segment 24A of the aft groove 20B toward the forward extremity 22A. As the aft roller 134B begins to displace upwardly into the forward segment 24A of the aft groove 20B, the aft flap pivot 135B of the single mounting bracket 133 pushes an aft portion of the flap 10 upwardly and causes the flap 10 to rotate about the aft flap pivot axis 135A". The flap 10 will also rotate about the forward flap pivot axis 135A'. This movement of the flap 10 coupled with its relative rotation about the aft flap pivot axis 135A" causes the flap trailing edge 11B to move upwards and thus the flap 10 assumes the negative flap deployment. In the retracted position, the forward roller 134A is disposed in proximity to the forward extremity 22A of the forward groove 20A, while the aft roller 134B is disposed in the proximity to the forward extremity 22A of aft groove 20B. When being displaced between positive and negative flap deployment, the flap 10 moves through the neutral position or neutral flap deployment, as shown FIG. 4A.

FIG. 5 shows the flap 10 displaceable along another embodiment of the groove 120. The groove 120 is the only groove 120 formed in the structural member 30 of the wing 5. The forward and aft flap carriages 32A,32B described above are displaceable along the single groove 120 to displace the flap 10 between negative and positive flap deployment. More particularly, the forward and aft flap carriages 32A,32B are displaceable along the single groove 120 between its forward and aft extremities 122A,122B. The single groove 120 has a kinked segment 124A which forms a relatively sharp turn or twist when compared to the remainder of the single groove 120. The kinked segment 124A is transverse to the remainder of the single groove 120. In the depicted embodiment, the directional axis of the kinked segment 124A is transverse to a line extending between the forward and aft extremities 122A,122B of the single groove 120. The kinked segment 124A has an upward orientation. The kinked segment 124A extends upwardly from a location on the length of the single groove 120 and terminates at the highest extremity 123. In an embodiment, the kinked segment 124A of the single groove 120 is oriented substantially parallel to the vertical axis VER of the aircraft 1, or forms an acute angle therewith. The highest extremity 123 is the highest or uppermost point of the single groove 120. The highest extremity 123 is thus higher than the aft extremity 122B of the single groove 120. In FIG. 5, the aft extremity 122B is the bottommost or lowest point of the single groove 120. Although shown as being substantially continuous, the single groove 120 in an alternate embodiment includes an obstruction or blockage in the single groove 120 between the forward and aft flap carriages 32A,32B to prevent displacement of the forward flap carriage 32A too far aft, and to prevent displacement of the aft flap carriage 32B too far forward. The obstruction of blockage may also force the aft flap carriage 32B into the kinked segment 124A during displacement in a forward direction. Although shown in FIG. 5 with two flap carriages 32A,32B, the single flap carriage 132 described above may also be used with the single groove 120 in an alternate embodiment.

FIG. 6 shows another embodiment of the forward and aft grooves 220A,220B, shown without the flap 10 inherently present for clarity. The forward and aft grooves 220A,220B overlap. The forward end 225A of the aft groove 220B is defined in the structure 30 to be disposed above the aft extremity 222B of the forward groove 220A. The forward segment 224A of the aft groove 220B is disposed above and forward of the aft extremity 222B of the forward groove 220A. The forward extremity 222A of the aft groove 220B is disposed above and forward of the aft extremity 222B of the forward groove 220A. Thus the most forward portion of the aft groove 220B is located forward of the most aft portion of the forward groove 220A. This arrangement of the forward and aft grooves 220A,220B may be suitable when the total displacement of the flap 10 between the neutral position and the extended position is substantial, thus requiring that the forward flap carriage 32A reach a point located aft of the forward extremity 222A of the aft groove 220B.

Referring to FIGS. 3A to 3C, there is also disclosed a method of deploying the flap 10. The method includes displacing the flap 10 along the groove 20 in at least a forward direction to a highest point 22A of the groove 20 being a forwardmost extremity of the groove 20. Displacement of the flap 10 to the highest point 22A of the groove 20 causes the flap 10 to pivot and position the flap trailing edge 11B in negative flap deployment.

The above description is meant to be exemplary only, and one skilled in the art will recognize that changes may be made to the embodiments described without departing from the scope of the invention disclosed. For example, for the sake of expediency, the features of the flap 10, groove 20,120, and flap carriages 32,132 are described herein with reference to the wings 5. However, it will be appreciated that the features of the flap 10, groove 20,120, and flap carriages 32,132 described herein with reference to the wings 5 are also associated with, or adaptable to, mutatis mutandis, flight control surfaces for the other airfoil assemblies of the aircraft 1, such as the vertical stabilizer 3 and the horizontal stabilizers 4. Still other modifications which fall within the scope of the present invention will be apparent to those skilled in the art, in light of a review of this disclosure, and such modifications are intended to fall within the appended claims.

The invention claimed is:

1. An aircraft wing, comprising:
a structural member disposed at a trailing edge of the aircraft wing and having at least one groove extending along a length between a forward extremity and an aft extremity, a forward segment of the at least one groove disposed at a forward end thereof and extending upwardly to the forward extremity, the forward extremity being a highest point of the at least one groove, an aft segment of the at least one groove extending in an aft direction from the forward segment to the aft extremity, the aft segment being lower than the forward segment;
at least one flap carriage mounted to the at least one groove and displaceable therealong between the forward and aft extremities;
a flap extending between a flap leading edge and a flap trailing edge, the flap being pivotably attached to the at least one flap carriage to define at least one flap pivot axis about which the flap is rotatable, the flap being displaceable with the at least one flap carriage; and
an actuator having a housing and an arm, the arm having a distal end mounted to the at least one flap carriage, the arm being extendable relative to the housing between an extended position and a retracted position to displace the at least one flap carriage along the at least one groove, the at least one flap carriage in the retracted position being disposed in the forward segment of the at least one groove and the flap being rotated about the at least one flap pivot axis to position the flap trailing edge in negative flap deployment, the at least one flap carriage in the extended position being disposed in the aft segment and the flap being rotated about the at least one flap pivot axis to position the flap trailing edge in positive flap deployment.

2. The aircraft wing as defined in claim 1, wherein the flap is pivotably attached to the at least one flap carriage to position the at least one flap pivot axis closer to the flap trailing edge than to the flap leading edge.

3. The aircraft wing as defined in claim 1, wherein the aft extremity is a lowest point of the at least one groove.

4. The aircraft wing as defined in claim 1, wherein the forward segment of the at least one groove is transverse to the aft segment.

5. The aircraft wing as defined in claim 1, wherein the at least one flap carriage in the retracted position occupies a position in the at least one groove that is higher than a position of the at least one flap carriage in the at least one groove in the extended position.

6. The aircraft wing as defined in claim 1, wherein:
the at least one groove includes a forward groove and an aft groove spaced apart aft of the forward groove, the aft groove having the forward segment disposed at a forward end thereof and extending upwardly to the forward extremity being the highest point of the aft groove;
the at least one flap carriage includes a forward flap carriage mounted to the forward groove and displaceable therealong, and an aft flap carriage mounted to the aft groove and displaceable therealong between the forward and aft extremities, the flap being pivotably attached to the forward flap carriage to define a forward flap pivot axis, and being pivotably attached to the aft flap carriage to define an aft flap pivot axis; and
the distal end of the arm is mounted to one of the forward and aft flap carriages.

7. The aircraft wing as defined in claim 6, wherein the distal end of the arm is mounted to the forward flap carriage.

8. The aircraft wing as defined in claim 6, wherein the forward groove is free of curvature.

9. The aircraft wing as defined in claim 6, wherein:
- in the retracted position, the aft flap carriage is disposed in the forward segment of the aft groove and the flap is rotated about the aft flap pivot axis to position the flap trailing edge in negative flap deployment, and the forward flap carriage is disposed in proximity to a forward extremity of the forward groove; and
- in the extended position, the aft flap carriage is disposed aft of the forward segment of the aft groove and the flap is rotated about the aft flap pivot axis to position the flap trailing edge in positive flap deployment, and the forward flap carriage is disposed in proximity to an aft extremity of the forward groove.

10. The aircraft wing as defined in claim 6, wherein the forward extremity of the aft groove is the highest point of both the forward and aft grooves.

11. The aircraft wing as defined in claim 1, wherein:
- the at least one groove includes a forward groove and an aft groove spaced apart aft of the forward groove, the aft groove having the forward segment disposed at a forward end thereof and extending upwardly to the forward extremity being the highest point of the aft groove;
- the at least one flap carriage includes a single flap carriage mounted to the forward and aft grooves and displaceable therealong, the flap being pivotably attached to the single flap carriage to define a forward flap pivot axis and an aft flap pivot axis.

12. The aircraft wing as defined in claim 1, wherein the at least one groove includes a single groove, and the at least one flap carriage includes a single flap carriage mounted to the single groove.

13. A method of deploying a flap pivotably mounted to a groove in a trailing-edge structure of an aircraft wing, the method comprising:
- displacing the flap along the groove in at least a forward direction to a highest point of the groove being a forwardmost extremity of the groove, displacement of the flap to the highest point of the groove causing the flap to pivot and position a flap trailing edge in negative flap deployment; and
- displacing the flap along the groove in an aft direction to a lowest point of the groove being an aft extremity of the groove, displacement of the flap toward the aft extremity causing the flap to pivot to position the flap trailing edge in positive flap deployment.

14. The method as defined in claim 13, further comprising displacing the flap along the groove to a position between the forwardmost and aft extremities, displacement of the flap to the position causing the flap to pivot to position the flap trailing edge in neutral flap deployment.

15. The method as defined in claim 13, wherein displacing the flap along the groove in at least the forward direction causes the flap to pivot about a flap pivot axis being closer to the flap trailing edge than to a flap leading edge.

16. The method as defined in claim 13, wherein displacing the flap along the groove includes displacing the flap along a forward groove and an aft groove spaced apart aft of the forward groove, the aft groove having the highest point, displacement of the flap causing the flap to pivot about a forward pivot axis and an aft pivot axis.

17. The method as defined in claim 16, wherein displacing the flap along the forward and aft grooves includes applying a force to the flap at a point thereon along the forward groove to displace the flap along both the forward and aft grooves.

18. The method as defined in claim 16, wherein displacing the flap along the forward and aft grooves includes displacing the flap along the forward groove in a direction being substantially straight.

\* \* \* \* \*